United States Patent [19]

Zitzelsberger et al.

[11] Patent Number: 5,645,725
[45] Date of Patent: Jul. 8, 1997

[54] PROCESS AND DEVICE FOR THE BIOLOGICAL TREATMENT OF ORGANICALLY POLLUTED WASTE WATER AND ORGANIC WASTE

[75] Inventors: Dorit Zitzelsberger, Weiden; Gerd Ahne, Merseburg; Josef Winter, Karlsruhe; Karl Bleicher, Duggendorf, all of Germany

[73] Assignee: Protec Partner Fuer Umwelttechnik GmbH, Weiden, Germany

[21] Appl. No.: 379,676

[22] PCT Filed: Aug. 9, 1993

[86] PCT No.: PCT/DE93/00713

§ 371 Date: Feb. 8, 1995

§ 102(e) Date: Feb. 8, 1995

[87] PCT Pub. No.: WO94/03402

PCT Pub. Date: Feb. 17, 1994

[30] Foreign Application Priority Data

Aug. 10, 1992 [DE] Germany ............ 42 26 416.2
Mar. 12, 1993 [DE] Germany ............ 43 08 408.7

[51] Int. Cl.$^6$ ............ C02F 3/30; C02F 3/12; C02F 3/10
[52] U.S. Cl. ............ 210/605; 210/613; 210/616; 210/617; 210/622; 210/630; 210/631; 210/694; 210/748; 210/764; 210/151; 210/167; 210/196; 210/199; 210/202; 210/266; 210/284; 210/903
[58] Field of Search ............ 210/604, 605, 210/612, 613, 616, 617, 620, 622, 630, 631, 650, 694, 748, 764, 766, 150, 151, 162, 167, 181, 195.1, 196, 199, 202, 262, 266, 284, 903

[56] References Cited

U.S. PATENT DOCUMENTS

| | | |
|---|---|---|
| 3,821,107 | 6/1974 | Peoples .................... 210/612 |
| 4,210,528 | 7/1980 | Coviello et al. . |
| 4,415,454 | 11/1983 | Fuchs .................... 210/616 |
| 4,501,665 | 2/1985 | Wilhelmson . |
| 4,800,021 | 1/1989 | Desbos .................... 210/605 |
| 4,812,237 | 3/1989 | Cawley et al. ............ 210/612 |
| 4,904,387 | 2/1990 | Jordan . |
| 4,919,815 | 4/1990 | Copa et al. ............ 210/605 |
| 4,933,076 | 6/1990 | Oshima et al. . |
| 4,983,299 | 1/1991 | Lupton et al. ............ 210/617 |
| 5,022,993 | 6/1991 | Williamson .................... 210/605 |
| 5,147,547 | 9/1992 | Savall et al. ............ 210/605 |
| 5,192,441 | 3/1993 | Sibony et al. ............ 210/616 |
| 5,258,121 | 11/1993 | Jordan et al. ............ 210/605 |
| 5,277,814 | 1/1994 | Winter et al. ............ 210/604 |

Primary Examiner—Stanley S. Silverman
Assistant Examiner—Theodore M. Green
Attorney, Agent, or Firm—Spencer & Frank

[57] ABSTRACT

A process and a device for biologically treating an organic waste mixture containing organically polluted waste water and solid components. The process and the device involve exposing the organic waste mixture to a first decomposition stage where the solid components and the waste water are separated from one another and where the solid components are decomposed under predominantly aerobic conditions. The waste water is then passed to a second decomposition stage where the waste water is decomposed under anoxic conditions. Thereafter, the waste water is passed to a third decomposition stage where the waste water is decomposed again under aerobic conditions thereby creating recirculation water. At least a portion of the recirculation water is returned from the third decomposition stage to the first decomposition stage for continuously recirculating water through and between respective decomposition stages.

36 Claims, 8 Drawing Sheets

PROCESS AND DEVICE FOR THE BIOLOGICAL TREATMENT OF ORGANICALLY POLLUTED WASTE WATER AND ORGANIC WASTE

FIELD OF THE INVENTION

The invention relates to a process and device for the biological treatment of organically polluted waste water and organic waste. It is the aim of such processes to decompose the organic material into low-molecular, low-energy compounds while reducing their volume as much as possible (mineralization), which can be discharged, for example into the ground or the sewer system, without placing a noticeable burden on the environment. The waste water from toilets, for example, essentially contains carbohydrates, C-polymers, proteins, amines, urea, ammonia and salts.

While the carbohydrate-containing components can be decomposed under aerobic conditions into carbon dioxide and water by microorganisms, the reduced nitrogen compounds are decomposed essentially into water and nitrates by nitrogen-fixing bacteria. Accordingly, the liquid obtained in the course of such aerobic decomposition processes contains considerable amounts of nitrate. Their introduction into rivers or lakes results in a nitrate over-fertilization having undesired consequences, such as increased growth of algae. Since nitrate ions are only lightly retained in the ground and accordingly can be easily washed out of the ground layers near the surface by rain water, their escape from, for example agricultural land, endangers the ground water.

Processes are known wherein an additional anaerobic decomposition stage is provided in order to convert at least a part of the nitrate into innocuous elementary nitrogen by means of nitrate-reducing microorganisms. A process is known from U.S. Pat. No. 4,210,528, wherein the waste water from toilets, together with the solids contained therein, is brought into a first anaerobic decomposition stage and is subsequently subjected to an aerobic treatment. In this process the liquid from the aerobic stage is filtered, passed over a bed of activated charcoal and used as the flushing water for the toilets. In this way the nitrate-containing water gets back into the anaerobic decomposition stage and is available there to the nitrate-reducing bacteria as a provider of oxygen for their respiratory metabolism.

A disadvantage of the known process or the known device lies in that the component of solids, which constitutes the main portion of the organic material to be decomposed, is subsequently decomposed under anoxic conditions. Biological communities of organisms are described by the term anoxic, in whose vicinity chemically fixed oxygen, for example in the form of nitrate, is present, but no dissolved oxygen. Decomposition under the mentioned conditions takes place by means of microorganisms which satisfy their oxygen requirements by reduction of the nitrate. This process is generally identified as nitrate reduction. Thus decomposition in the known processes depends on the presence of nitrate. To achieve complete decomposition, the portion of nitrogen compounds would have to attain values which are not present in conventional and particularly communal waste waters. The result is that, following the consumption of the nitrogen compounds, sulfate reduction and anaerobic decomposition processes begin. Besides the development of hydrogen sulfide, there is the main disadvantage that the anoxic decomposition processes proceed considerably more slowly. Accordingly, extended retention times or large reaction chambers are necessary to obtain a sufficient decomposition rate. A further disadvantage of the known process resides in that the return of nitrate-containing liquids from the anaerobic decomposition stage into the anoxic one is coupled to the use of the toilets. An extended non-use of the toilet leads, on the one hand, to a lack of nitrate in the anoxic stage and an increase in aerobic decomposition processes whose end products are gases such as methane, hydrogen sulfide and mercaptan. These gases enter the environment and contribute, among other things, to the destruction of the ozone layer, besides being strongly odiferous. A further disadvantage of the known device lies in that it is necessary to comminute the solid portion introduced into the anoxic decomposition stage in order to be able to achieve acceptable decomposition rates. For this purpose the known device provides a stirring device which is intermittently motor-driven and uses energy and is prone to malfunction.

SUMMARY OF THE INVENTION

Based on the above, it is the object of the invention to provide a device and a process for the biological treatment of an organic waste mixture containing organically polluted waste, or solid components water and organic waste, which device does not have the disadvantages of the prior art and is suited for mobile toilet installations.

This object is attained by a process according to which the solid portion of, for example toilet waste water or organic wet waste from kitchens, etc., is separated and decomposed in a first decomposition stage under predominantly aerobic conditions. The liquid portion is passed into an adjoining second decomposition stage in which anoxic conditions prevail. After passage through this decomposition stage, the liquid is finally passed into a third decomposition stage in which aerobic condition prevail again. To increase the decomposition rates, biologically active substrate structures are present at least in the second and third stages which serve as growing surfaces for the microorganisms. The liquid from the third stage is returned to the first stage for maintaining continuous recirculation.

An advantage of the process of the invention resides in that the solids which occur in relatively large amounts are mainly decomposed aerobically and therefore in an accelerated manner and practically without the development of gases, such as methane and hydrogen sulfide, as is the case in connection with anaerobic decomposition processes. The nitrate- and oxygen-containing liquid, which is continuously recirculated from the third decomposition stage into the first decomposition stage, reaches the collection of solids at the first decomposition stage and moistens the collection of solids through layers thereof. By means of the above, aerobic metabolic processes in the areas of solid collection near the surface of the collection are aided by means of the oxygen content of the liquid. The liquid also penetrates layers of the solid collection which are far from the surface of the collection. Nitrate contained in the mixture is reduced to elementary nitrogen (denitrification). Metabolic processes generating methane and hydrogen sulfide are repressed in this manner. The liquid returned into the first decomposition stage is enriched at that location with soluble decomposition products, such as sugar and fatty acids, and reaches the second decomposition stage, where denitrification takes place, i.e. the nitrate-reducing microorganisms or denitrifiers remove from the nitrate ion the oxygen which is necessary for the "respiration" of carbon containing compounds or C-compounds.

Finally, an aerobic decomposition of C-compounds into carbon dioxide and water and the nitrification of nitrogen containing compounds or N-compounds, i.e. an oxidation into nitrate, takes place in the third stage. The nitrate created here is again decomposed to elementary nitrogen in the second decomposition stage because of the continuous recirculation. As a final result, practically all of the nitrogen which is bound in the form of organic compounds is converted into elementary gaseous nitrogen and removed from the decomposition circuit.

A further advantage of the process of the invention lies in that the decomposition of the solids takes place in a separate stage with a considerable reduction of the volume or space necessary to effect such decomposition. The above is due solely to the fact that a portion of the water content of the solids, which is up to 98% with plant materials, can evaporate. The evaporation of the water is further aided by the increase of the temperature in the solid collection as a result of the metabolic processes of the microorganisms. This is not possible in the process according to the prior art, where the solid portion is suspended in the liquid phase. A further reason for the large reduction in volume lies in that gaseous carbon dioxide and water are created as the end products of the anaerobic decomposition processes, where at least a part of the water also evaporates.

A further advantage of the process of the invention lies in the fact that foreign bodies which cannot be decomposed, for example those which have entered through the toilet, are already kept back in the first stage, where they practically do not interfere. In processes operating with solids suspensions, such foreign bodies can plug up filters and biologically active substrate structures. In the extreme case this can result in a standstill of the installation. Finally, a further advantage of the process of the invention lies in that the accumulation of sludge in the liquid phase, i.e. in the second and third decomposition stages, is considerably less as compared with the processes operating with solids suspensions. Increased sludge formation can lead to plugged-up filters and substrate structures and results in increased maintenance and cleaning efforts.

In accordance with a further embodiment of the invention, the microorganisms always have a sufficient amount of trace elements available to them. Trace elements such as calcium, magnesium, cobalt, nickel and iron (micro-elements) are needed by the bacteria for building up endogenic substances, among other things. The above therefore contributes to the creation of optimal conditions for the microorganisms, which results in an increased rate of multiplication of the microorganism and decomposition effected thereby. On the other hand, the particles made of mineral matter or activated charcoal have a large interior surface because of their porosity, which interior surface can be used by the microorganisms as an additional growing surface. Furthermore, activated charcoal particles have the advantages listed further down below.

According to yet another embodiment of the invention the activated charcoal bed is used as a "carbon reservoir", in that it has the property of adsorbing carbon compounds for allowing the denitrifiers present in the anoxic decomposition stage to be able to always fall back on a carbon and energy reservoir. The above comes into play particularly in case no fresh organic material has been supplied to the system for an extended period of time. A further advantage of the activated charcoal bed lies in its capacity to act as a "buffer", so to speak, for load fluctuations. In case of large loads, a portion of the dissolved organic compounds is retained adsorptively by the charcoal bed so that load peaks in the adjoining aerobic third decomposition stage are prevented. Two processes which compete for oxygen take place at the second decomposition stage, namely the oxidative decomposition of carbon compounds and nitrification of N-compounds. A large increase in the concentration of decomposable carbon compounds naturally inhibits the parallel occurring nitrification. This would lead to a reduction of the nitrate concentration and in the end to the inhibition of the denitrification at the second decomposition stage.

Finally, it is also advantageous that the activated charcoal bed can simultaneously be used as the biological substrate structure, i.e. as the growing medium, for the microorganisms.

According to a further embodiment of the invention, an entry of additional water into the system in the course of the biological treatment of toilet waste water is prevented. On the one hand, the above would lead to a reduction in the retention time or would result in the need to use correspondingly larger reaction chambers. On the other hand, the entry of additional water into the system during biological treatment of the waste water would create the need to use valuable drinking water for toilet flushing.

According to another embodiment of the invention the liquid is removed from the third decomposition stage and allocated for use as flushing water for a toilet or water to be expelled to the environment in a hygienically unobjectionable condition. Particularly advantageous options for sterilization include the use of UV treatment, which is very effective, requires a small amount of energy, is easy to maintain and is environmentally friendly. However, processes such as pasteurization or anodic oxidation can also be employed.

Moreover, filtration and sterilization can be achieved by means of cross flow filtration. This process is practically maintenance-free, in contrast to conventional filter processes where the filters must always be cleaned or replaced. Depending on the type of diaphragm filter used, it is possible to achieve micro- or ultra-filtration. In the latter case it is possible to even filter the smallest microorganisms, such as viruses, out of the liquid used for flushing the toilet or which is passed on to the environment.

Since activated charcoal is a hydrophobic adsorbent, mainly non-polar compounds or compounds with hydrophobic groups are adsorbed into the charcoal, such as fats, fatty acids and oils from fecal matter and kitchen refuse. These compounds are therefore concentrated on the surface of the activated charcoal, and therefore result in the formation of a flora which is particularly advantageous for the decomposition of the compounds. The result is a more effective decomposition of the compounds. In contrast to toilet waste water and organic waste, communal waste water contains appreciable amounts of relatively hard-to-decompose active laundry substances and preservation agents, and, in addition, tensides and substances such as chlorinated aromatics, and formaldehyde, aromatics, benzoic and sorbic acid. These compounds are also preferably adsorbed by activated charcoal. A decomposition chamber can be provided in accordance with another embodiment of the invention by interposing a further aerobic compartment with an activated charcoal bed between the second, anoxic, and the third, aerobic compartment in which a biological community of organisms can form which specializes in the decomposition of the mentioned compounds. As mentioned above, the adsorption of compounds by activated charcoal causes a concentration of the hard-to-decompose compounds and thus an increase in the effectiveness of decomposition. A further advantage of the mentioned steps rests in that the retention time, in the compartment, of the absorbed compounds is increased because of the adsorption. The above in turn has a positive effect on the settlement and increase of specialized microorganisms. The mentioned compounds are retained and decomposed in the interposed compartment where they do not, or do only to a small extent, get into the adjacent aerobic compartment. The microorganisms which have settled in the interposed compartment are therefore protected from the tenside and hydrocarbon load of the waste water. Therefore two decomposition chambers with different floras are produced by means of the interposition of a further compartment as noted above, where the difficult-to-decompose load of dirt in the waste water is kept back in the interposed compartment and is decomposed by specialized microorganisms.

The object of the invention is further attained by a device suitable for executing the process in accordance with the invention. According to one embodiment of the invention, the different decomposition compartments are arranged one above the other. The above arrangement is particularly advantageous if the device of the invention is to be placed in installations with limited usable space, for example railroad cars or mobile homes.

According to another embodiment of the invention, a biologically active substrate structure comprising a plastic sintered material can be disposed in the second compartment, and can further be produced simply and cost-effectively. The material is also very usable for sintering-in porous particles made of mineral materials and/or activated charcoal, in a simple manner. The advantages of such an arrangement have already been described above.

According to yet another embodiment of the invention, the second compartment is connected with the third compartment disposed below it by an overflow pipe disposed in the second compartment and extending over almost its entire height. In the above arrangement, the second compartment and the substrate structure and activated charcoal bed located therein are always covered with liquid. By means of the above, it is possible to always maintain strict anoxic conditions.

According to a further embodiment of the invention, a filter basket for keeping back the solid components is disposed in the first compartment. The filter basket may comprise woven wire or plastic sintered material. In addition, porous particles of a mineral material and/or activated charcoal may be embedded in the plastic sintered material. As already mentioned above, the latter embodiment in particular has the advantage that the porous particles of a mineral material embedded in the filter constitute a depot for trace elements which can be accessed by the microorganisms which decompose the solids portion. Furthermore, the embedded porous particles have the advantage of having a large interior surface and can therefore serve, in addition to the plastic sintered particles, to immobilize microorganisms. The same applies to the activated charcoal particles embedded in the sintered material.

In accordance another embodiment of the invention, means for injecting air are provided in the third compartment in order to maintain a sufficiently high oxygen content in the liquid.

In accordance with yet another embodiment of the invention the air escaping from the liquid in the third compartment is advantageously employed for assisting the aerobic solids decomposition in the first compartment. This step is particularly effective if the air can be distributed as evenly as possible within the collection of the solids.

BRIEF DESCRIPTION OF THE DRAWINGS

The invention will now be explained in detail by means of exemplary embodiments represented in the attached drawings where.

DETAILED DESCRIPTION OF THE PREFERRED EMBODIMENTS

Figure 1:
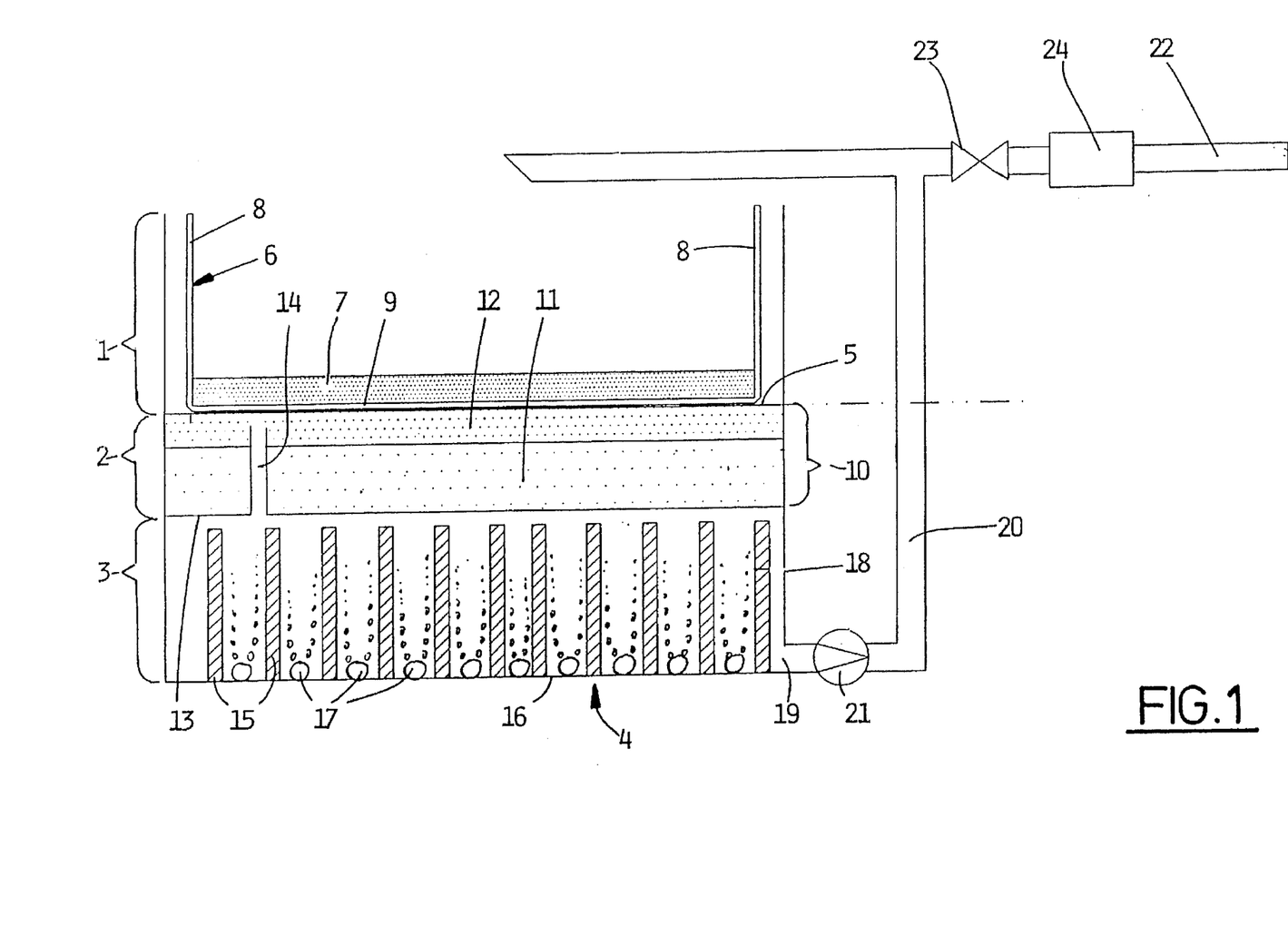
FIG. 1 is a cross sectional schematic view of an embodiment of the device of the invention.

As can be seen from FIG. 1, the device in accordance with the invention contains altogether three stacked compartments (1, 2, 3) which together comprise a bioreactor 4. The first compartment, compartment 1, disposed at the top of the bioreactor is connected to the outside air and is designed for aerobic decomposition. The second compartment, compartment 2, disposed below compartment 1 is used for anoxic decomposition, and the lowest compartment 3 which is the third compartment finally is again used for aerobic decomposition. A horizontally extending separating wall 5 is disposed between the compartments 1 and 2, and is permeable to liquids. A filter basket 6, open at the top, is disposed in the compartment 1 and is used for separating the solid components from the waste water supplied to the device. The solid components are deposited in the filter basket 6 in the form of a filter cake 7. The filter basket 6 has vertical lateral walls 8 and a horizontally extending bottom 9. In the simplest embodiment, the lateral walls 8 and the bottom 9 could be made of wire mesh. But at least the bottom 9 can also be made of a plastic sintered material. Polyethylene, for example, can be used as the plastic. Sintered material of this type is obtained by sintering the plastic particles together. In the process, a material interspersed with hollow spaces or pores is created. Such materials are used in other technical fields, for example, as air filters. A further embodiment option for the filter basket 6 consists in placing a layer of the sintered material on the wire mesh bottom 9 of the filter basket 6. Finally, it is also conceivable to make the entire filter basket 6 of a plastic sintered material. Particles of a mineral material and/or activated charcoal particles can be embedded in the plastic sintered material. Such particles are porous and provide additional growing surfaces for microorganisms available. Furthermore, the mineral material particles function as depositories for trace elements.

It is also conceivable to use two filter baskets instead of one and to charge the baskets successively. The above could also be achieved by means of a filter basket divided into two halves. Finally, it is also possible to dispose the filter basket replaceably in the compartment 1. The above would have the advantage that a filter basket could be simply exchanged for a cleaned filter basket during regularly scheduled cleaning of the device.

The compartment 2, in which anoxic conditions prevail, is disposed below the aerobic compartment 1. A bed 11 of activated charcoal grains is disposed in the lower part 10 of the compartment 2 and extends over practically its entire cross-sectional surface in a horizontal plane to form a biologically active substrate structure. A layer of a biologically active substrate structure 12, essentially consisting of a polyethylene sintered material, also extending over practically the entire cross-sectional surface, in a horizontal plane, of the compartment and essentially extending parallel with the bottom 9 of the filter basket, is disposed in the remainder of the space of the compartment 2 above the activated charcoal bed 11. Particles of porous mineral materials, such as light expanded clay aggregate, slag or tufa, are embedded in this sintered material. It is also possible to embed into the sintered material activated charcoal particles. The functioning of this filter and of the particles therein embedded will be described further below.

The compartment 2 is separated from the compartment 3 disposed below it by means of a gas- and liquid-proof separating wall 13. The connection between the two compartments is assured by an overflow pipe 14 disposed in the compartment 2 and connected with the compartment 3. This overflow pipe 14 essentially extends over the entire height of the compartment 2, so that the activated charcoal bed 11 and the substrate structure 12 contained therein are covered with dammed-up liquid. Biologically active substrate structures 15 are also disposed in the compartment 3. These are embodied in the form of walls extending vertically, disposed parallel in respect to each other and essentially extending over the entire width of the compartment 3. The vertical extension of the substrate structures 15 is slightly less than the height of the compartment 3. A space is therefore present between the upper end faces of the substrate structures 15 and the separating wall 13, which space allows a flow of liquid. The substrate structures 15 are also made of a polyethylene sintered material into which mineral material and/or activated charcoal is embedded. Ventilating means 17 are disposed at the bottom 16 of the compartment 3. These can be embodied in the form of pipes, for example, which are disposed between the substrate structures 15 and whose surfaces are perforated. Air blown into the pipes exits through the perforations of the pipes and is partially dissolved in the liquid. The excess air, collecting below the separating wall 13, can be removed through an opening (not shown) in the compartment 3.

A drain opening 19 is provided in the lower area of the lateral wall 18 of the compartment 3 adjoining the bottom 16 and is connected with a recirculating line 20. The recirculating line 20 is guided toward the top into the compartment 1 and terminates there. A recirculating pump 21 is disposed in the recirculating line 20 for maintaining a recirculating flow of liquid. An outlet line 22 branches off the recirculating lines 20, by means of which it is possible to drain liquid from the compartment 3 when a defined filling level has been reached. For this purpose the outlet line 22 has a valve 23 which is triggered via a filling level sensor (not shown) in the compartment 3. In addition, a sanitizing and filtering unit 24 is disposed between the valve 23 and the outlet line 22.

The process in accordance with the invention will now be described by means of the exemplary embodiment illustrated in FIG. 1:

The waste water coming from one or several toilets, for example, is supplied through an inlet line (not shown) to the compartment 1. The solids portion of the waste water (fecal matter, toilet paper, etc.) is retained in the filter basket 6 disposed therein, because of which a collection of solids builds up in the manner of a filter cake 7 with time. The liquid running out of the compartment 1 first reaches the compartment 2 and then, via the run-off pipe 14, the compartment 3. The compartment 1 is connected with the environment so that the entry of oxygen from the air for maintaining the aerobic conditions is assured. As will be shown further down below, a forced ventilation of the filter cake 7 can take place to assist aerobic decomposition, in particular in case of increased amounts of solids.

Aerobic conditions prevail in the areas of the filter cake 7 close to the surface thereof or in the areas located in the vicinity of the forced ventilation means (air distributor 26 in FIG. 2)(to be described further below). Essentially, an oxidative decomposition of organic carbon and nitrogen compounds (carbohydrates, fats, proteins) takes place here. Both processes can be shown by way of example by means of the following simplified empirical formula:

I $C_6H_{12}O_6 + 6 O_2 \longrightarrow 6 CO_2 + 6 H_2O$

Ammonification:

II $R-NH_2 + 2 H_2O \longrightarrow NH_4^+ + R-OH + OH-$

III $NH_2-CO-NH_2 + 3 H_2O \longrightarrow CO_2 + 2 NH_4^+ + 2 OH-$

Nitrification:

IV $2 NH_4^+ + 3 O_2 \longrightarrow 2 NO_2^- + 2 H_2O + 4 H^+$

V $2 NO_2^- + O_2 \longrightarrow 2 NO_3^-$

The empirical formulas IV and V represent the processes occurring during the so-called nitrification stage. The first reaction step IV is performed for example by nitrosomonas and the second in accordance with V, for example by nitrobacters.

Anaerobic and anoxic decomposition processes take place in lower layers not provided with oxygen, which can be represented in a simplified manner by means of an example of glucose in approximately this way:

VI $C_6H_{12}O_6 \longrightarrow 3 CO_2 + 3 CH_4$ (minimal)

VII $C_6H_{12}O_6 \longrightarrow$ fatty acids, alcohols, ketones

Denitrification:

VIII Fatty acids, alcohols, ketones + $NO_3^- \longrightarrow N_2 + CO_2 + H_2O$ The nitrate converted by denitrification (VIII) into nitrogen in the anaerobic zones of the filter cake comes mainly from the liquid from the compartment 3, which was supplied to the compartment 1 through the recirculating line 20, and partially from the nitrification in the aerobic zones of the filter cake 7. Because of the presence of nitrate, the methane formation in accordance with VI is forced back in favor of the denitrification.

Anoxic conditions prevail in compartment 2. The liquid in this compartment predominantly contains nitrate and organic C-compounds which partially stem from the toilet waste water supplied, and partially from the decomposition process taking place in the solids compartment 1. The decomposition of nitrate/nitrite to elementary nitrogen (denitrification) takes place under the prevalent anoxic conditions. The gaseous nitrogen is conducted to the outside through an opening (not shown) in the compartment 2. In the course of denitrification, also called "nitrate respiration" because of its parallelism with oxygen respiration, the nitrate ion is used as the oxygen supplier or as a terminal hydrogen acceptor. The decomposition processes operating during "respiration" can be represented in a simplified manner in approximately the following manner:

IX Organic fatty acids, sugar, etc. $+NO_3^- \longrightarrow CO_2 + N_2 + H_2O$

X $CH_3-COOH + HNO_3' \longrightarrow 2CO_2 + 1/2N_2 + H_2O$

XI $5CH_3-CH_2-COOH + 14HNO_3 \longrightarrow 15CO_2 + 7N_2 + 22H_2O$

XII $C_6H_{12}O_6 \longrightarrow 3CO_2 + 3CH_4$ (minimal)

In this compartment the methane formation is also extremely low and practically negligible.

The activated charcoal bed 11 disposed in the compartment 2 and the substrate structure 12 located above it have several functions. For one, they are used as a growth material for microorganisms, i.e. after some time in use, their exterior and at least a part of their interior surface is covered by a growth of bacteria. Furthermore, the activated charcoal bed 11 functions as a "carbon buffer". Organic C decomposition products released from the filter cake 7 or soluble organic C-compounds and dyestuffs from fecal matter contained in the waste water fed to the charcoal bed, or aromatic and aliphatic hydrocarbons are kept back by adsorption by the activated charcoal bed 11. Activated charcoal has the property of adsorbing non-polar or hydrophobic compounds or those with hydrophobic groups, and is thus "loaded up" with these compounds. Two effects are attained by virtue of the above. For one, a sharp increase in the concentration of the C-compounds mentioned above is prevented in the compartment 3 in the case of load peaks, i. e. of increased amounts of supplied waste water or heavily contaminated waste water. As will be shown, two different reactions competing for oxygen take place in this compartment, namely the oxidative decomposition of organic carbon compounds and, parallel thereto, the nitrification taking place following the mineralization of organic nitrogen compounds. Naturally the first mentioned reaction would preferably take place with an increasing concentration of the organic carbon compounds, while nitrification would be inhibited correspondingly. A second effect of the "buffer effect" lies in that in case of a lack of waste water supplied to the compartment 1 over a longer period of time, the depletion of carbon-containing organic compounds is compensated. Thus, the denitrification could fall back on the carbon compounds adsorbed into the activated charcoal and assure an optimal conversion of nitrate into elementary nitrogen.

Aerobic conditions again prevail in the third compartment 3 and are maintained by the injection of air therein by ventilating means 17. Similar to the aerobic regions in the filter cake 7, two different decomposition processes take place in the third compartment. In the inlet area, i.e. in the area in the vicinity of the termination of the overflow pipe 14, the oxidative decomposition of the remainder of organic compounds still contained in the liquid preferably takes place. In the areas further away from the overflow pipe 14, however, nitrification is preponderant. The substrate structures 15 of the compartment 3 are used as a growing medium for microorganisms.

Because of their interior surfaces, the mineral material and/or activated charcoal particles embedded in the substrate structures 12, 15 or in the polyethylene sintered material in general cause an increase in the growth surfaces for microorganisms. Furthermore, the mineral material particles are used for supplying the microorganisms with trace elements.

Figure 2:
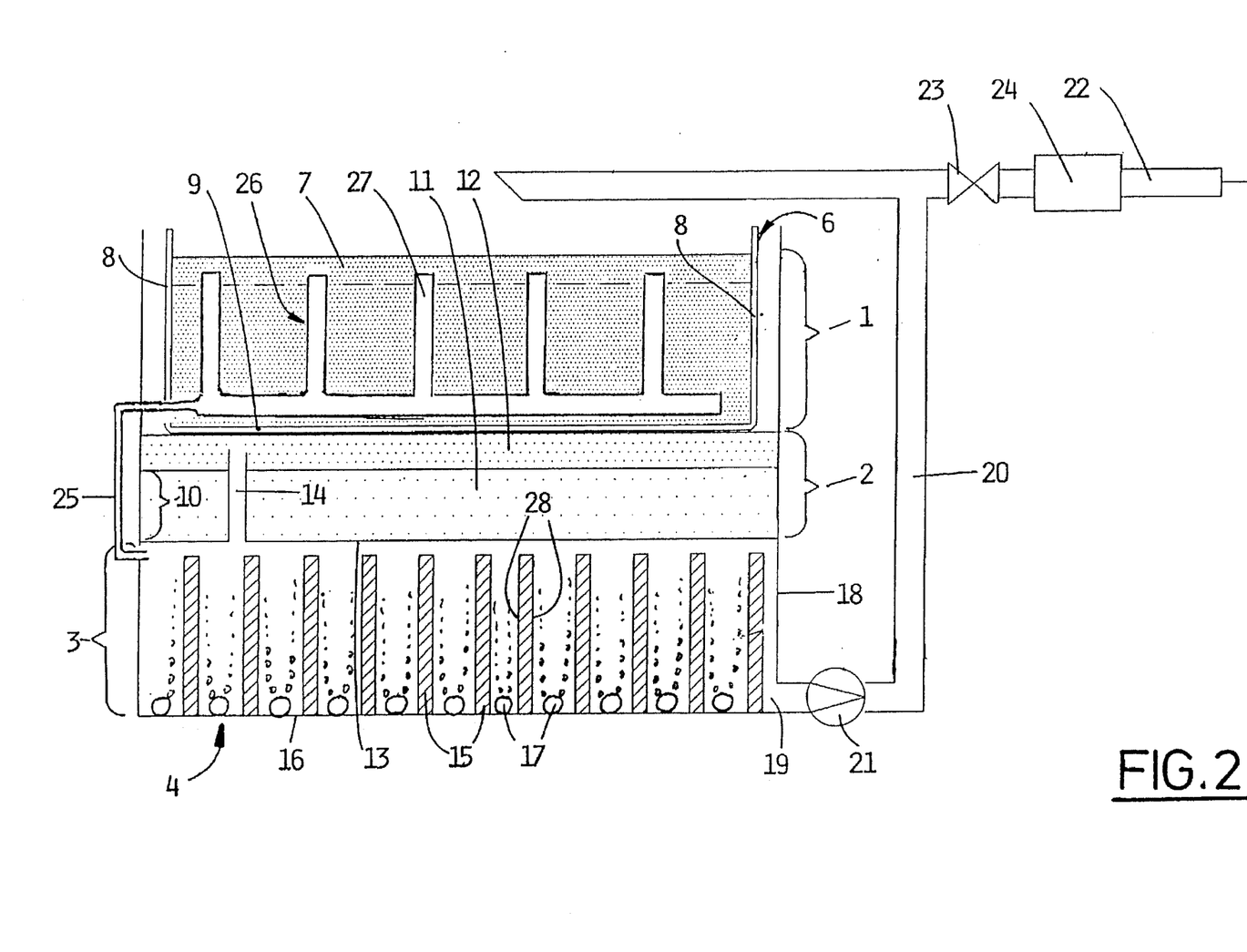
FIG. 2 is a cross sectional schematic view of a further embodiment of the device of the invention.

An exemplary embodiment is represented in FIG. 2 in which the air fed to the compartment 3 is supplied via a collecting line 25 to an air distributor 26 disposed inside the filter basket 6. As shown schematically by way of example in FIG. 2, this air distributor 26 can contain perforated pipes 27 disposed at a distance from each other in the filter basket 6 and extending in the vertical direction. In this way it is possible to decompose an increased portion of the filter cake 7 aerobically.

Figure 3:
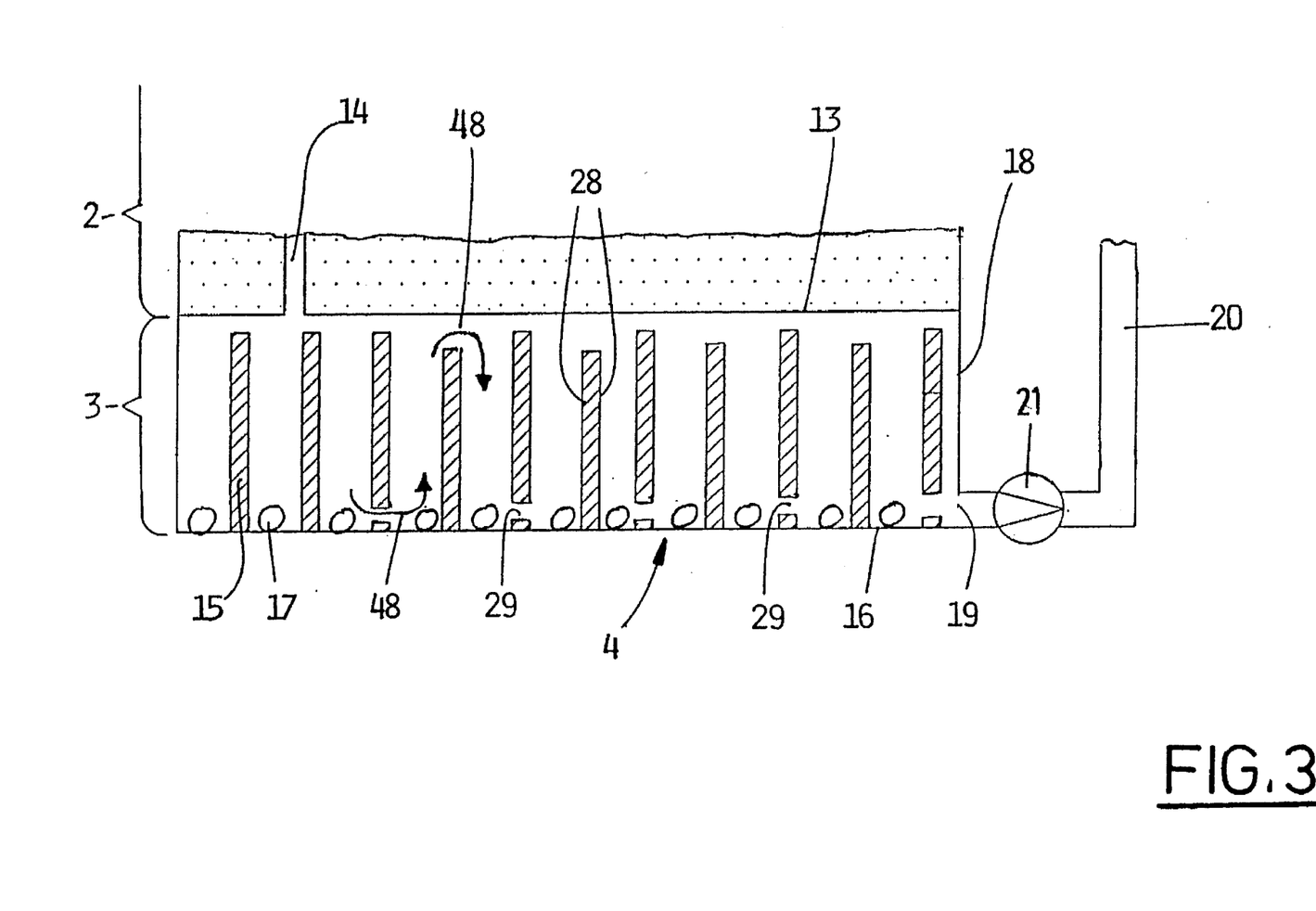
FIG. 3 is a partial cross sectional schematic view of an embodiment of the invention showing an advantageous design of the biologically active substrate structure in the third compartment.

An embodiment of a device in accordance with the invention is illustrated in FIG. 3, wherein each second substrate structure has a flow-through opening 29 in its lower area and wherein the substrate structure 15 located between two such substrate structures has a reduced height. The liquid flowing from the mouth of the overflow pipe 14 to the outflow opening is therefore forced to take the path indicated by the arrows 48. The advantage of this embodiment lies in that the biologically active contact surface 28 provided by the substrate structures 15 as a whole is utilized more effectively.

Figure 4:
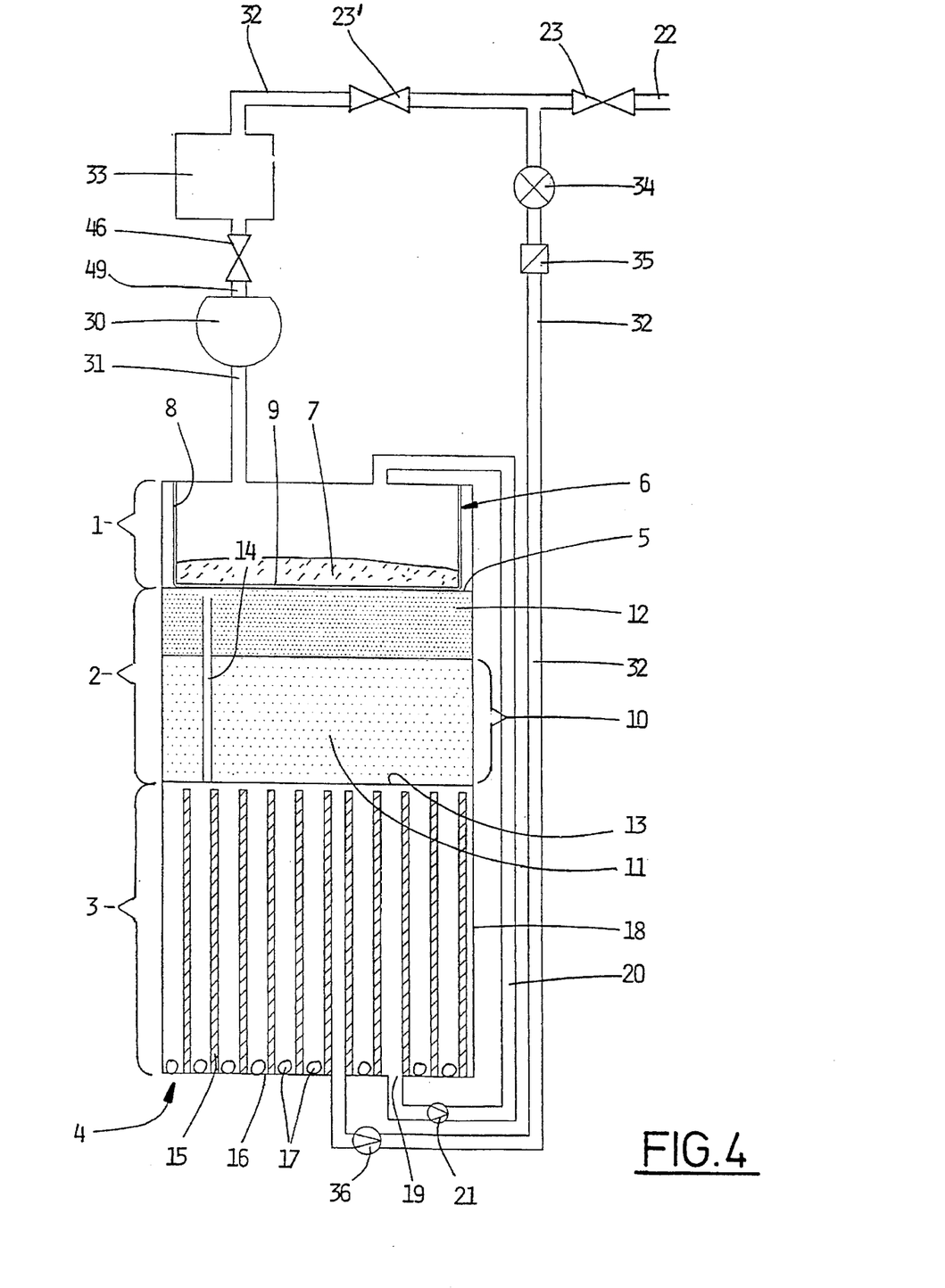
FIG. 4 is a cross sectional view of an exemplary schematic embodiment of the invention, showing an integrated toilet.

A device in accordance with the invention with a toilet connected therewith is represented in FIG. 4. This device is particularly suited for toilet installations in vehicles, such as travel trailers or railroad cars. In this embodiment the compartment 1 is connected via a supply line 31 with a toilet 30. The flushing liquid for the toilet is taken from the compartment 3 and supplied via a flushing water line 32 to a reservoir 33, from which it can be taken as needed for flushing the toilet 30.

On the flushing water side, the toilet 30 is connected via a line 49 with the reservoir 33. A valve 46 is disposed in the line 49 and can be operated manually or by foot, for example.

A sanitizing device 34 and a filter 35 are placed upstream of the reservoir 33. By means of the filter 35 it is possible to filter out fine solids particles from the liquid drawn from the compartment 3. It is also conceivable to provide this filter unit with an additional activated charcoal filter by means of which it would be possible, for example, to absorb dyestuffs dissolved in the liquid. To sterilize the liquid in the sanitizing device 34, it is possible to proceed in different ways. UV radiation has proven to be particularly advantageous, since it operates dependably and in addition has a very low energy consumption. A pump 36 for conveying the liquid from the compartment 3 to the reservoir 33 is disposed in the flushing water line 32. A fill level regulator (not shown) is disposed in the reservoir 33, which switches the pump on at a minimum fill level and switches it off at a maximum fill level. In this exemplary embodiment, the recirculation of the liquid inside the bioreactor 4 has been resolved in the same manner as with the exemplary embodiments corresponding to FIGS. 1 and 2. The removal of liquid from the system takes place via an outlet line 22 branching off the flushing water line 32 downstream of the sanitizing unit 34. In this case the valve 23' is closed, but the valve 23 is opened.

Figure 5:
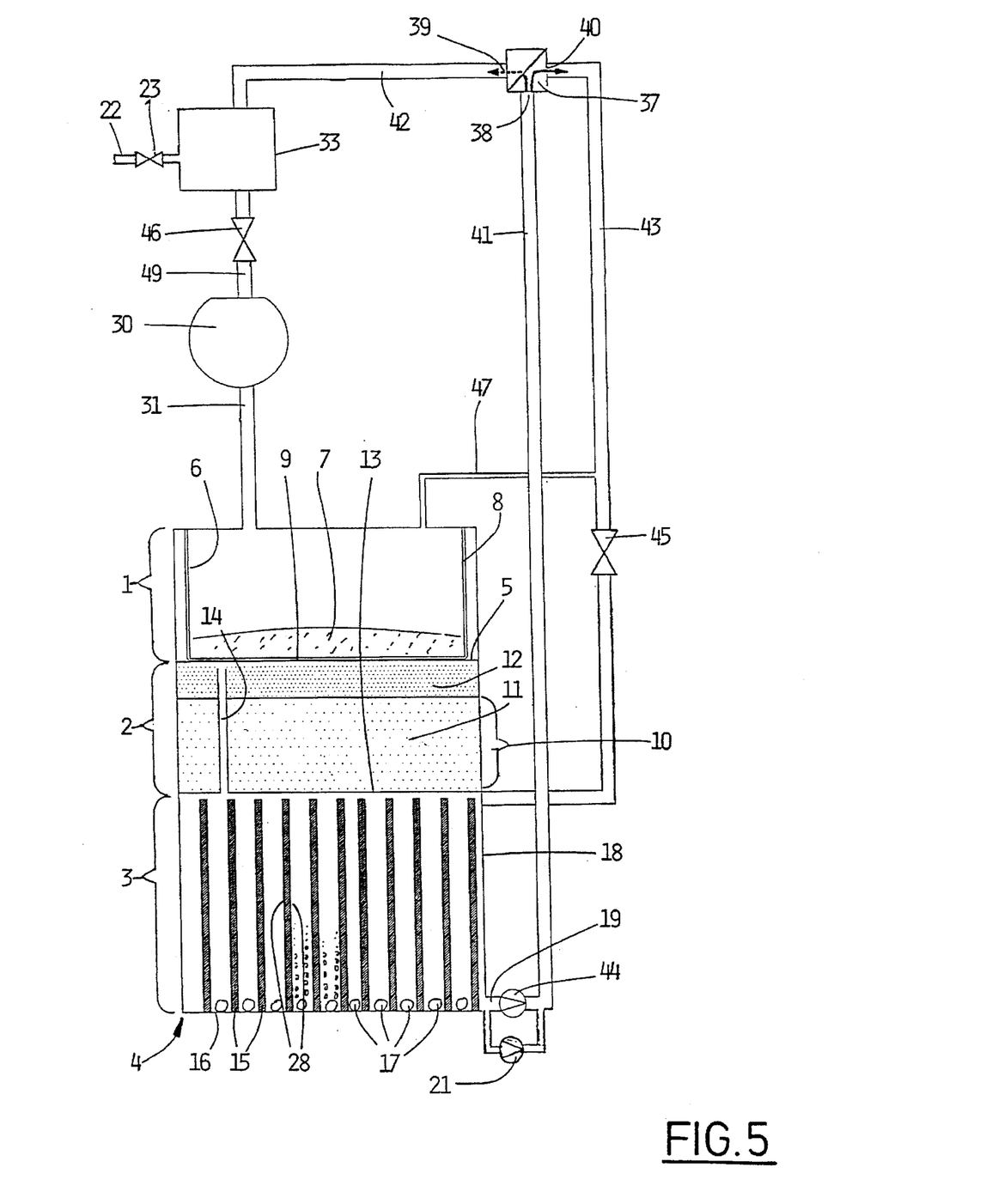
FIG. 5 is a cross sectional schematic view of an exemplary embodiment of the invention, showing an integrated toilet and cross-flow filtration.

An exemplary embodiment with an integrated cross flow filter installation is illustrated in FIG. 5. The cross flow filter installation contains a cross flow filter 37 as the essential component. The latter has an inlet 38 for the liquid from the compartment 3 to be filtered, a permeate outlet 39 and a residue outlet 40. The inlet 38 is connected via a main flow line 41 with the drain opening 19 of the aerobic compartment 3. The permeate outlet 39 is connected via a permeate line 42 with the reservoir 33. Finally, the residue outlet 40 is connected via a residue line 43 with the aerobic compartment 3. A valve 45 is disposed in the residue line 43. The cross flow filter installation operates as follows: the liquid from the aerobic compartment 3 is transported by means of a main flow pump 44 to the cross flow filter 37. The liquid filtered in the cross flow filter 37, the permeate, flows via the permeate line 42 to the reservoir 33. The residue, however, flows via the residue line 43 and the opened valve 45 back to the compartment 3. A recirculating line 47, which terminates from above in the compartment 1, branches off in the direction of the permeate flow upstream of the valve 45. The cross section of the recirculating line 47 is designed in such a way that, when the cross flow installation is operating, a recirculating flow adapted to the respective design of the bioreactor 4 is assured.

When reaching a defined maximum liquid level in the reservoir 33, the valve 45 is closed by a suitable control device (not shown) and the main flow pump 44 is turned off. In order to assure a continuous recirculation of the liquid in the bioreactor 4 even in this operational state, a recirculating pump 21 is disposed in a parallel circuit with the main flow pump 44. The former is put into operation when the maximum fill level in the reservoir 33 has been reached. A return of the liquid from the aerobic compartment 3 into the first aerobic compartment 1 takes place in this way via the main flow line 41, the residue line 43 and the recirculating line 47. It is of course possible to employ a two-stage or continuously controllable pump in place of two separate pumps 44, 21 with different conveying outputs.

In a device with, for example, a 400 liter bioreactor, the liquid flows represented in the following table occur:

TABLE 1

| Main flow | apprx. 1500 l/h |
| Permeate flow | 20–30 l/h |
| Residue flow | apprx. 1460 l/h |
| Recirculating flow | 15 l/h |

The removal of liquid from the bioreactor is assured in this embodiment by means of an outlet line 22, closed by a valve 23, which is attached to the reservoir 33 below the maximum fill level. Upon reaching the maximum fill level in the compartment 3 as well as in the reservoir 33, the recirculating pump 21 is shut off and the main flow pump 44 turned on by means of a suitable control device (not shown), and the valve 45 is opened. The permeate flow is conducted via the permeate line 42 into the reservoir 33 and removed to the outside via the valve 23 which is also opened at this time.

Figure 6:
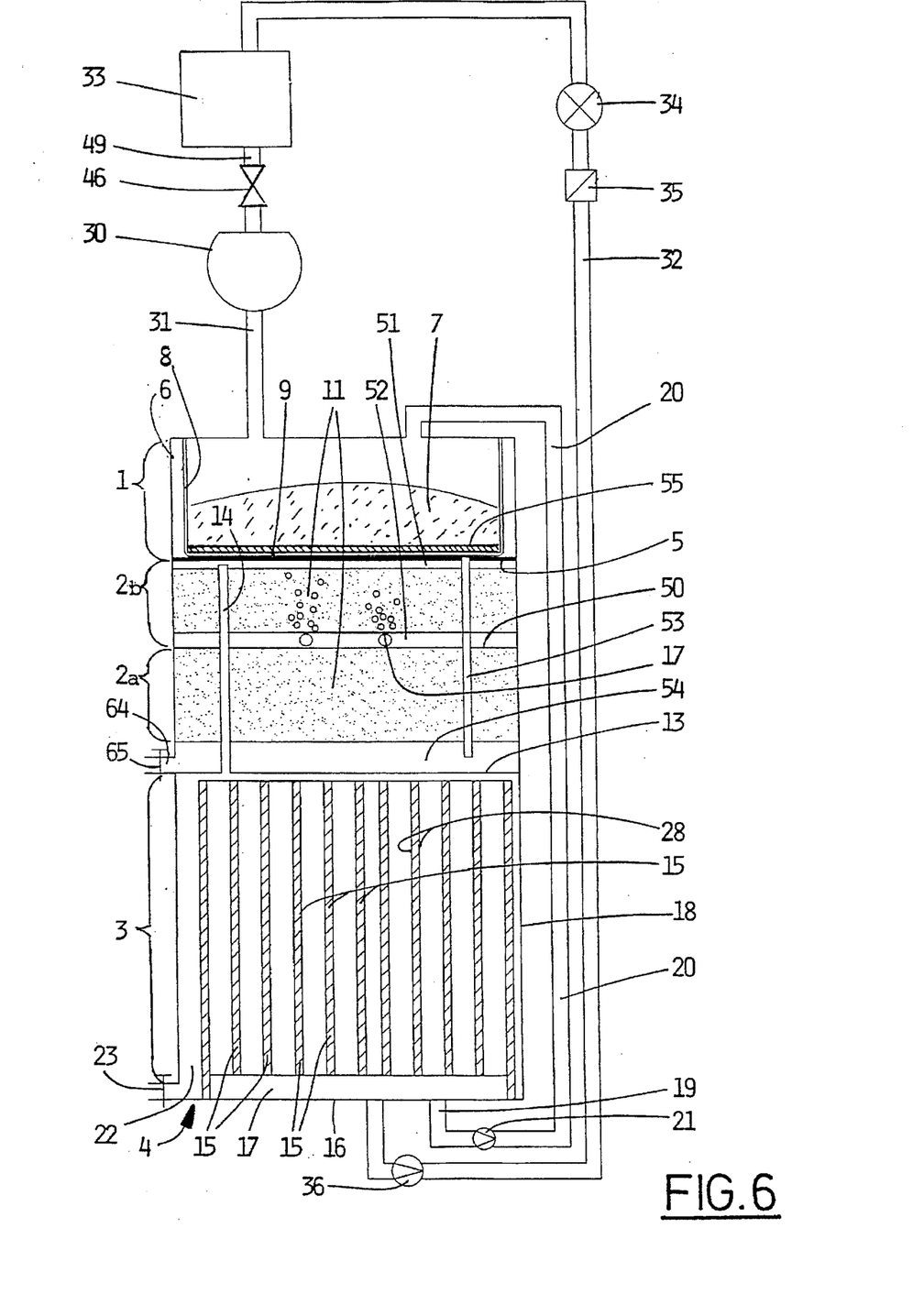
FIG. 6, is a view corresponding to FIG. 5, showing an additional aerobic compartment.

An exemplary embodiment is represented in FIG. 6, wherein the bioreactor 4 is composed of a total of four compartments. A compartment 2b in which aerobic conditions prevail is disposed below the compartment 1. Ventilating means 17 embodied as perforated pipes through which air is blown are disposed in an area close to the bottom of compartment 2b for maintaining these conditions. An activated charcoal bed 11 is disposed as the growth material for microorganisms and extends practically over the entire cross-sectional surface of the compartment 2b in a horizontal plane. However, in the vertical direction it only fills the center area of the compartment 2b, so that spaces 51 and, 52, free of activated charcoal, are respectively formed between the activated charcoal and the separating wall 5 with the compartment 1, and the separating wall 50 to the compartment 2a which adjoins the lower portion of the activated charcoal. The ventilating means 17 are located in the space 52.

A compartment 2a adjoins the bottom of the compartment 2b and also contains an activated charcoal bed 11 and is separated from the compartment 2b by the separating wall 50. So, while this separating wall lets liquid and gas through, the separating wall 5 between the compartment 1 and the compartment 2b is sealed against gas and liquids. Anoxic conditions prevail in the compartment 2a and aerobic conditions in the compartment 2b.

The compartment 2a is connected with the compartment 1 via a connecting pipe 53, whose upper end passes through the separating wall 5 and whose lower end terminates in the area 54 close to the bottom of the compartment 2. Compartment 2a contains an activated charcoal bed and extends over the entire cross-sectional surface of the compartment 2a in a horizontal plane. The two compartments 2a and 2b are connected with each other via the liquid- and gas-permeable separating wall 50.

The compartment 2b is connected with the compartment 3 by means of an overflow pipe 14, whose lower end terminates in the upper part of the compartment 3 and whose upper end terminates in the space 51 located between the activated charcoal bed 11 and the separating wall 5.

The mode of operation of the device illustrated in FIG. 6 is as follows: the liquid flowing out of the filter basket 6 reaches the area 54 of the compartment 2a via the connecting pipe 53, and from there the compartment 2b via the separating wall 50. The compartments 2a and 2b and the activated charcoal beds 11 therein are covered with dammed-up liquid. Finally, from the compartment 2b the liquid reaches the compartment 3 via the overflow pipe 14.

The decomposition of organic compounds with simultaneous nitrate reduction (denitrification) takes place in the compartment 2a, the same as in compartment 2 of the above described exemplary embodiments, but an aerobic decomposition in compartment 2b. The advantage of the additional compartment 2b has already been described above.

In the device in accordance with FIG. 6, in the compartment 2a the flow is directed from below against the activated charcoal bed 11. The advantage of this type of flow which, incidentally can also be used in the above described exemplary embodiments, lies in that the solids and sludge particles carried along with the liquid can be deposited in the area 54 below the activated charcoal bed 11. By means of an outlet line 64 disposed in this area it is possible to easily remove the sludge accumulations from there by opening the valve 65. If required, this can also take place independently of regularly scheduled maintenance work. With a flow from the top onto the activated charcoal bed 11, the solids or sludge particles can be deposited on top of the activated charcoal bed 11 and seal it off in the manner of a filter cake.

A filter layer 55 of a decomposable material is disposed on the bottom 9 of the filter basket 6. Pressed straw pieces have been proven to be particularly advantageous. Such a filter layer is progressively loosened up by biological decomposition while forming new penetration channels, so that the sealing of already present penetration channels by solid particles is compensated in this manner. A layer of pressed straw pieces with a height of approximately 2 cm and having the following parameters has been shown to be advantageous:

| | |
|---|---|
| Bed volume, dry: | 500 g/l |
| Water absorption: | 2 l/l or 4 l/kg |
| Density, swelled: | apprx. 1 kg/l |
| Fiber length, swelled: | 1 to 5 mm |

Figure 7:
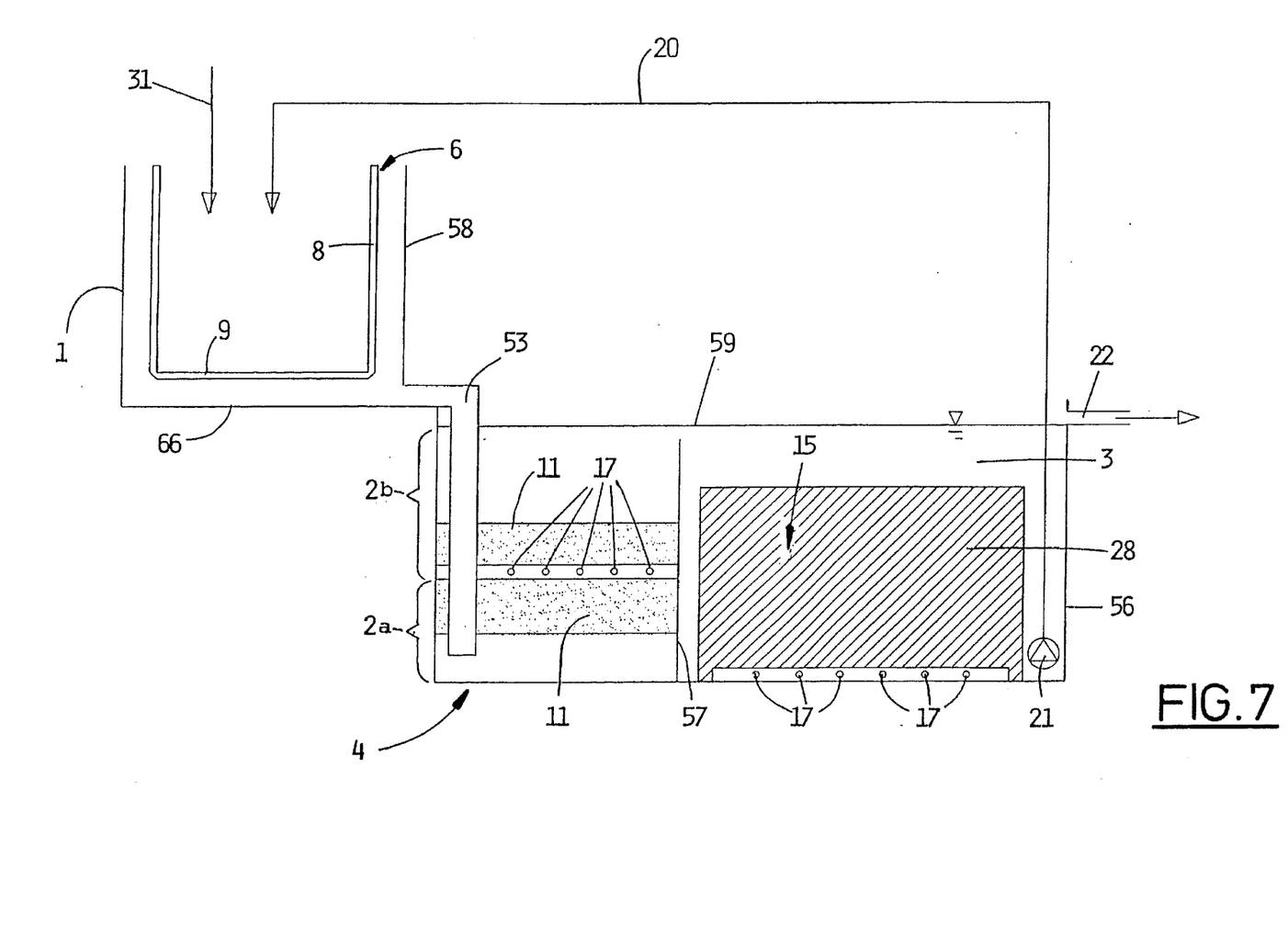
FIGS. 7 and 8, are views corresponding to FIG. 6, showing alternate relative dispositions of the compartments.
Figure 8:
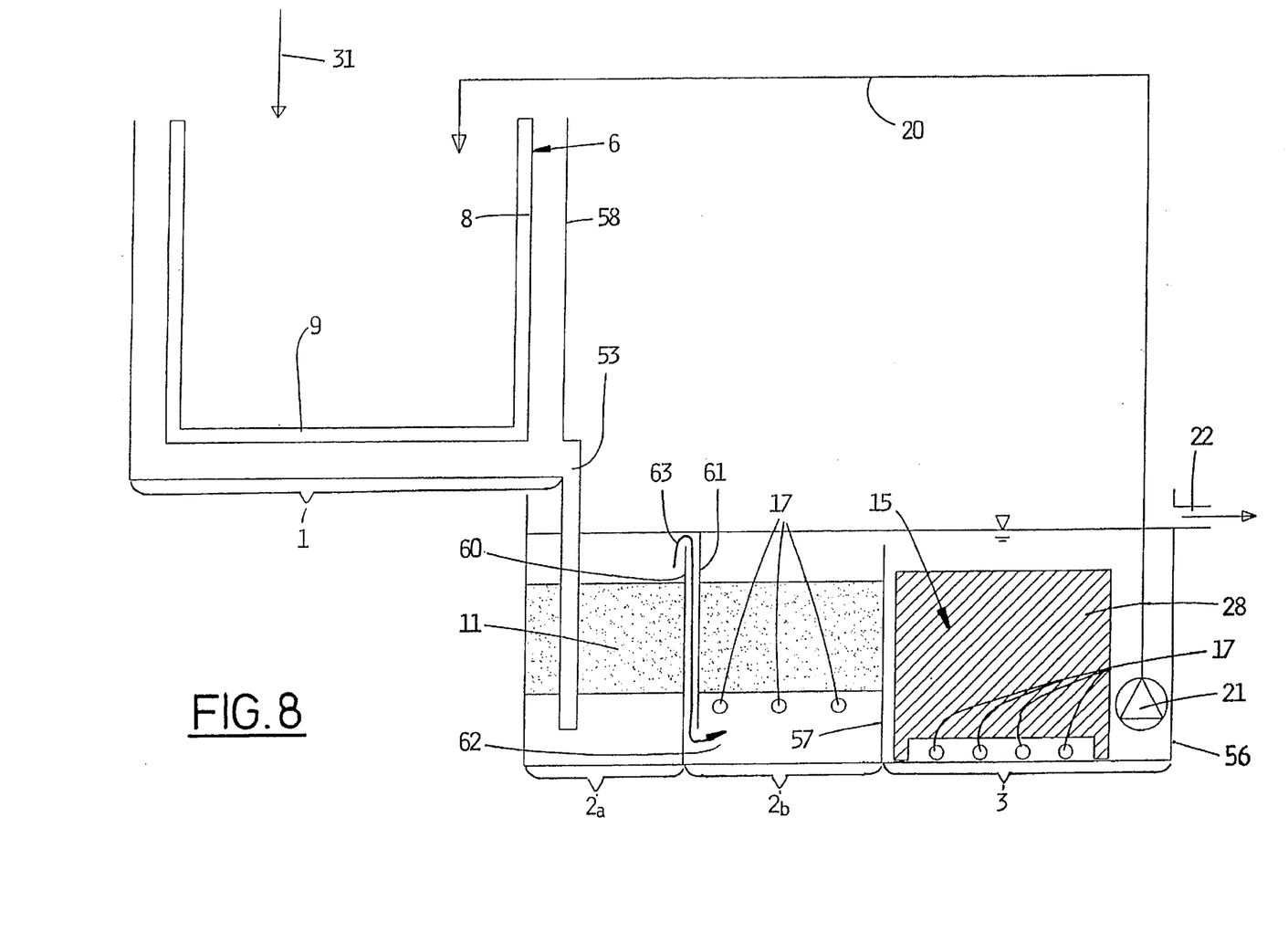

FIGS. 7 and 8 show exemplary embodiments of a device in accordance with the invention with a different arrangement of the compartments 1, 2a, 2b and 3. While the compartments 2a and 2b continue to be arranged above each other as in the exemplary embodiment corresponding to FIG. 6, the compartment 3 is disposed laterally thereof. The compartments 2a, 2b and 3 are disposed in a common container 56 and are separated from each other by a baffle plate 57.

The compartment 1 is placed in a separate container 58, which is disposed laterally on the container 56 and in such a way that its bottom 66 is located above the liquid level 59 in the container 56. The compartment 1 is connected with the compartment 2a via a connecting pipe 53. The latter branches off toward the bottom of container 56 from the container 58 and terminates below the activated charcoal bed 11 of the compartment 2a. In this exemplary embodiment the flow is also directed from below against the activated charcoal bed 11 in an advantageous manner. The height of the baffle plate 57 is less than the height of the water column in the container 56.

In the exemplary embodiment in accordance with FIG. 8, the compartments 2a and 2b are also disposed side-by-side in the container 56. The two compartments are separated from each other by two walls 60, 61, which are disposed parallel and at a distance from each other. The height of the wall 60 is less than the liquid column in the container 56, but the height of the wall 61 is greater. The wall 61 has at least one opening 62 at its end near the bottom. In this way the two walls 61 and 62 form a conduit connecting the two compartments 2a and 2b, through which the liquid flows from the compartment in the direction of the arrow 63.

The advantage of the arrangements in accordance with FIG. 7 and FIG. 8 mainly consists in that the individual compartments are easily accessible from above for maintenance and cleaning work. They are advantageously employed in all cases where little installed height is available or where installation in the ground is necessary. Accessibility from above is a considerable advantage in the last case in particular.

Two sample layouts are shown in the following Tables 2 and 3. In each case an input which was burdened with 6100 mg/l chemical oxygen demand or COD, and a total nitrogen content of 1500 mg/l was used as the basis. With a retention time of three days, a reduction of the COD value by approximately 95% and of the total nitrogen content by approximately 88% was achieved in both cases.

TABLE 2

| | COD [mg/l] | Total N [mg/l] |
|---|---|---|
| Input | 6100 | 1500 |
| Output | 300 | 180 |
| Volume loading | 1800 mg/l d* | 660 mg/l d |
| Recirculation rate | 5/d | |
| Reactor volume | 400 l | |
| Solids compartment | 100 l | |
| Anoxic compartment | 100 l | |
| Aerobic compartment | 200 l | |
| Retention time | 3 d | |

TABLE 3

| | COD [mg/l] | Total N [mg/l] |
|---|---|---|
| Input | 6100 | 1500 |
| Output | 300 | 180 |
| Volume loading | 1933 mg/l d* | 660 mg/l d |
| Recirculation rate | 5/d | |
| Reactor volume | 40 l | |
| Solids compartment | 22 l | |
| Anoxic compartment | 6 l | |
| Aerobic compartment | 12 l | |
| Retention time | 3 d | |

*This value relates to the total content of dissolved and solid oxygen-consuming substances; the latter are mainly decomposed in the solids compartment.

A device in accordance with the invention with a layout corresponding to Table 2 is suitable for use in a railroad car, for example. The output shows COD as well as nitrogen values which permit the dispersal or expelling of the liquid directly into the ground, preferably during travel. The compartment 1 which retains the solids and decomposes them preferably aerobically is laid out in such a way that the maintenance intervals for emptying and cleaning are several months. In contrast to this, the reservoir of conventional toilet installations must be emptied at intervals of several days.

The device in accordance with the invention is also suited for other vehicles, such as mobile homes, aircraft and ships. Also conceivable is the employment in buildings to which sewers cannot be connected, as in the case of summer houses or weekend houses. It is also conceivable to employ the device of the invention in mobile toilet installations which can be used at large construction sites or with outdoor events, for example. In the same way it is conceivable to connect the device in accordance with the invention to one or several vacuum toilets.

We claim:

1. A process for biologically treating an organic waste mixture containing organically polluted waste water and solid components, the process comprising the steps of:

exposing the organic waste mixture to a first decomposition stage, the step of exposing including the steps of:

separating the solid components and the waste water from one another; and decomposing the solid components under predominantly aerobic conditions;

passing the waste water from the first decomposition stage to a second decomposition stage;

decomposing the waste water at the second decomposition stage under anoxic conditions;

passing the waste water from the second decomposition stage to a third decomposition stage;

decomposing the waste water at the third decomposition stage under aerobic conditions thereby creating recirculation water;

returning at least a portion of the recirculation water from the third decomposition stage to the first decomposition stage for continuously recirculating water through and between respective ones of the first decomposition stage, the second decomposition stage and the third decomposition stage.

2. The process according to claim 1, wherein at least the steps of decomposing the waste water at the second decomposition stage and decomposing the waste water at the third decomposition stage include the step of utilizing biologically active substrate structures.

3. The process according to claim 2, wherein at least the step of decomposing the waste water at the second decomposition stage includes the step of utilizing a substrate structure having embedded therein at least one of porous mineral material particles and activated charcoal particles.

4. The process according to claim 3, wherein the step of decomposing the waste water at the second decomposition stage further includes the step of utilizing an activated charcoal bed.

5. The process according to claim 2, wherein the step of decomposing the waste water at the second decomposition stage includes the step of utilizing an activated charcoal bed.

6. The process according to claim 1, further including the step of allocating a portion of the recirculation water to serve as at least one of flushing water for a toilet and water to be expelled from the device.

7. The process according to claim 6, further including the step of filtering and sterilizing the recirculation water before the recirculation water is at least one of used as flushing water for the toilet and expelled.

8. The process according to claim 7, wherein the step of sterilizing includes the step of exposing the recirculation water to one of UV radiation, pasteurization and anodic oxidation.

9. The process according to claim 7, wherein the step of filtering includes the step of subjecting the recirculation water to at least one of micro-filtration and cross flow filtration.

10. The process according to claim 1, wherein the step of passing the waste water from the second decomposition stage to the third decomposition stage includes the step of passing the waste water from the second decomposition stage to a fourth decomposition stage interposed between the second decomposition stage and the third decomposition stage, the process further including the step of decomposing the waste water at the fourth decomposition stage under aerobic conditions.

11. The process according to claim 10, wherein at least the steps of decomposing the waste water at the second decomposition stage, decomposing the waste water at the third decomposition stage and decomposing the waste water at the fourth decomposition stage include the step of utilizing biologically active substrate structures.

12. The process according to claim 11, wherein the step of utilizing biologically active substrate structures includes the step of using an activated charcoal bed.

13. The process according to claim 11, wherein at least the step of decomposing the waste water at the second decomposition stage includes the step of utilizing a substrate structure having embedded therein at least one of porous mineral material particles and activated charcoal particles.

14. A device for biologically treating an organic waste mixture containing organically polluted waste water and solid components, the device comprising:
a first compartment for separating the solid components and the waste water from one another, and for decomposing the solid components under predominantly aerobic conditions;
a second compartment in flow communication with the first compartment for receiving the waste water therefrom, the second compartment being effective for decomposing the waste water under anoxic conditions and including a first set of biologically active substrate structures disposed therein;
a third compartment in flow communication with the second compartment for receiving the waste water therefrom, the third compartment being effective for decomposing the waste water under aerobic conditions and including a second set of biologically active substrate structures disposed therein; and
means operatively connected to the first compartment and the third compartment for returning at least a portion of the recirculation water from the third compartment to the first compartment.

15. The device according to claim 14, wherein the first compartment, second compartment and third compartment are arranged in a stack such that one of the compartments forms a top compartment, another of the compartments forms a middle compartment, and a last one of the compartments forms a bottom compartment.

16. The device according to claim 15, wherein the second compartment is disposed above the third compartment and includes an overflow pipe disposed therein, the overflow pipe extending over almost an entire height of the second compartment and effecting flow communication between the second compartment and the third compartment.

17. The device according to claim 14, wherein the first set of biologically active substrate structures include a plastic sintered material.

18. The device according to claim 17, wherein the plastic sintered material has embedded therein at least one of porous mineral material particles and activated charcoal particles.

19. The device according to claim 14, wherein the first set of biologically active substrate structures includes an activated charcoal bed.

20. The device according to claim 14, wherein the first set of biologically active substrate structures include:
a plastic sintered material having embedded therein at least one of porous mineral material particles and activated charcoal particles; and
an activated charcoal bed.

21. The device according to claim 20, wherein the plastic sintered material is disposed above the charcoal bed.

22. The device according to claim 14, wherein the first compartment includes a filter basket disposed therein for retaining the solid components.

23. The device according to claim 22, wherein the filter basket is made of woven wire.

24. The device according to claim 22, wherein the filter basket is made of plastic sintered material.

25. The device according to claim 24, wherein the plastic sintered material has embedded therein at least one of porous mineral material particles and activated charcoal particles.

26. The device according to claim 14, wherein the third compartment includes means for injecting air into the waste water contained therein.

27. The device according to claim 26, wherein the first compartment includes a filter basket disposed therein for retaining the solid components, the device further including means for transferring air escaping from waste water contained in the third compartment to the first compartment for distributing the air therein within the filter basket.

28. The device according to claim 14, wherein the second set of biologically active substrate structures essentially comprise a plastic sintered material having embedded therein at least one of porous mineral material particles and activated charcoal particles.

29. The device according to claim 14, wherein the means for returning includes means for continuously recirculating water through and between respective ones of the first compartment, the second compartment and the third compartment.

30. The device according to claim 14, further including means for allocating a portion of the recirculation water to serve as at least one of flushing water for a toilet and water to be expelled from the device.

31. The device according to claim 30, further including a filtering and sterilizing unit for filtering and sterilizing the recirculation water before the recirculation water is at least one of used as flushing water for the toilet and expelled from the device.

32. The device according to claim 31, wherein the filtering and sterilizing unit comprises a cross flow filtration device.

33. The device according to claim 31, wherein the filtering and sterilizing unit includes means for exposing the recirculation water to one of UV radiation, pasteurization and anodic oxidation.

34. The device according to claim 15, further including a fourth compartment having an inlet in flow communication with the second compartment for receiving waste water therefrom, and an outlet in flow communication with the third compartment for supplying waste water thereto, the fourth compartment being effective for decomposing waste water under aerobic conditions.

35. The device according to claim 34, wherein the fourth compartment includes means for injecting air therein and is disposed above the second compartment.

36. The device according to claim 34, wherein the fourth compartment includes a third set of biologically active substrate structures disposed therein comprising an activated charcoal bed.

* * * * *